United States Patent
Medvinsky

(10) Patent No.: US 7,450,722 B2
(45) Date of Patent: Nov. 11, 2008

(54) SUBSET DIFFERENCE METHOD FOR MULTI-CAST REKEYING

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 408 days.

(21) Appl. No.: 10/318,486

(22) Filed: Dec. 13, 2002

(65) Prior Publication Data

US 2004/0114762 A1 Jun. 17, 2004

(51) Int. Cl.
*H04L 9/16* (2006.01)
*H04L 9/08* (2006.01)
*H04K 1/00* (2006.01)

(52) U.S. Cl. .................. 380/277; 380/273; 713/163
(58) Field of Classification Search .......... 380/277, 380/273; 713/163
See application file for complete search history.

(56) References Cited

U.S. PATENT DOCUMENTS

| | | | | |
|---|---|---|---|---|
| 7,065,643 | B1* | 6/2006 | Cornils et al. | 713/163 |
| 2002/0002678 | A1* | 1/2002 | Chow et al. | 713/169 |
| 2002/0094081 | A1* | 7/2002 | Medvinsky | 380/44 |
| 2002/0104001 | A1* | 8/2002 | Lotspiech et al. | 713/163 |
| 2002/0133701 | A1* | 9/2002 | Lotspiech et al. | 713/163 |
| 2002/0138437 | A1* | 9/2002 | Lewin et al. | 705/51 |
| 2002/0172366 | A1* | 11/2002 | Peterka et al. | 380/277 |
| 2003/0044017 | A1* | 3/2003 | Briscoe | 380/277 |
| 2003/0126464 | A1* | 7/2003 | McDaniel et al. | 713/201 |
| 2003/0140235 | A1* | 7/2003 | Immega et al. | 713/186 |
| 2003/0142826 | A1* | 7/2003 | Asano | 380/277 |
| 2003/0198350 | A1* | 10/2003 | Foster et al. | 380/281 |

OTHER PUBLICATIONS

Naor, Moni et al, "Efficient Trace and Revoke Schemes," Lecture Notes In Computer Science; vol. 1962, Proceedings of the 4th International Conference on Financial Cryptography, 2000, pp. 1-20.*
Halevy D.; Shamir A.: The LSD Broadcast Encryption Scheme: CRYPTO 2002 LNCS 2442, pp. 47-60, Springer-Verlag Berlin Germany XP002279256—Abstract; p. 47, Line 1; p. 56, last line.
Naor, Dalit, et al., "Revocation and Tracing Schemes for Stateless Receivers," IBM Almaden Research Center, Feb. 24, 2001, 33 pages.

* cited by examiner

*Primary Examiner*—Emmanuel L Moise
*Assistant Examiner*—Michael Pyzocha
(74) *Attorney, Agent, or Firm*—Stewart M. Wiener

(57) ABSTRACT

An improved subset-difference method is provided. The improved method uses the value of a current content key to help generate the requisite difference keys. The requisite difference keys are then used to encrypt the next content key which will be delivered only to users who are supposed to remain in the group. Users who have the current content key are then able to generate the requisite difference keys which they can then use to decrypt the next content key. Using the decrypted next content key, the users are then able to continue to receive contents. Since previously revoked users do not have the current content key, they are unable to determine the next content key and thus are prevented from receiving future contents.

5 Claims, 2 Drawing Sheets

US 7,450,722 B2

SUBSET DIFFERENCE METHOD FOR MULTI-CAST REKEYING

BACKGROUND OF THE INVENTION

The present invention generally relates to multicasting in a network, and more specifically, to a method and system for providing improved multicast key management in a network.

Using modern technologies that are available today, content delivery systems are capable of delivering contents over computer networks to a large number of users. A typical content delivery system includes a caching server responsible for delivering contents and a large number of clients or client applications that are under the control of the users. For example, a content delivery system may need to support hundreds of thousands, and possibly even millions, of users viewing a single event or program. In some cases, the programs are lengthy in duration and users are interested in only viewing some portion of a program (e.g., Olympics, shopping channel, news etc.). In order to charge users for such programming, it then becomes necessary to support a pay-by-time model. In a pay-by-time model, a user is charged only for the portion of the program that he or she consumed.

In a secure set-top client, such pay-by-time functionality may be more easily implemented in a secure manner. For example, tamper-proof hardware can be used in the set-top client to report in an accurate manner the amount of time that the client tuned in to a particular program. However, a general personal computer (PC) client cannot be trusted to perform such a task securely. This is because such PC client can be easily hacked. As a result, in order to support pay-by-time functionality with untrusted clients, a program needs to be delivered in a secure manner. One way to assure secure delivery of a program is to divide the program into program segments. There is a unique program segment key associated with each program segment, where the program segment key could be either used to encrypt the content within that program segment directly or it can be used to encrypt multiple content keys. A user that is authorized for a particular program segment will get the corresponding program segment key and will use it to decrypt the multiple content keys that are in turn used to decrypt the content within the program segment for viewing. In this manner, users that decide to leave a multicast or broadcast program would simply not be given more program segment keys for the following program segments, while the remaining users would continue receiving new program segment keys to allow them to continue viewing.

One straight-forward approach to support pay-by-time key management is to individually deliver the next program segment key to each user that remains in the multicast or broadcast group. This approach presents a number of problems. For example, for large multicast groups, this approach requires delivering program segment keys well ahead of time to ensure that such keys are delivered in time for each user. Even then, pay-by-time system scalability is severely limited by re-keying and the size of each program segment must be sufficiently large to insure that subsequent program segment keys can be delivered in time.

A number of multicast re-keying approaches have been proposed in an attempt to solve the foregoing problem. Many of these approaches are efficient at revoking a few users at a time from a multicast group and are based on the assumption that users leave at a constant rate. However, in practical situations, a large number of users may leave and users cannot be expected to leave a multicast group on a constant basis. To the contrary, user departure rate tends to fluctuate widely over the course of a program. For example, a large number of users tend to all want to leave a multicast group after some logical portion of the program is over (e.g., a specific Olympic event). Hence, these existing approaches still do not provide sufficient scalability that would efficiently accommodate varying user departure rate, such as, when a large number of users decide to leave a multicast group within a short period of time (e.g., within the same program segment).

In one of the proposed multicast key management schemes commonly known as the subset-difference method, each user is placed as a leaf into a binary tree and is given a subset of keys in that tree that depends on the user's position in that tree. The first time that a subgroup of users needs to be revoked from the group, the overhead of removing such subgroup of users from the group is proportional to the size of the to-be-revoked subgroup. This appears to provide as much scalability as can be expected. However, as time goes on and additional users leave the group, the overhead of removing such subsequent users becomes proportional to the number of users that have left the group since the beginning of the event. Consequently, as more and more users leave the group, the ability to revoke users from the group will likely degrade to an unacceptable level.

For purposes of illustration and simplicity herein, it should be understood that a user can be either a person or a client or client application or device that is under the control of a user.

FIG. 1 is a simplified schematic diagram illustrating a set of users belonging to a particular multicast group that have been arranged into a binary tree according to the subset-difference method. The binary tree has a number of nodes $V_1$-$V_{15}$ and a number of leaves $V_{16}$-$V_{31}$. The leaves of the tree $V_{16}$-$V_{31}$, represent the actual users and the leaves that are shaded, $V_{18}$, $V_{19}$, $V_{21}$, $V_{24}$, $V_{25}$, $V_{26}$ and $V_{27}$, correspond to users that are to be revoked from the group.

The binary tree is further divided into subtrees that are rooted at nodes $V_4$, $V_5$ and $V_3$. Each of these subtrees contains an inner subtree, where an inner subtree includes only the to-be-revoked leaves. For example, for a subtree rooted at node $V_4$, there is an inner subtree rooted at node $V_9$ that contains only the to-be-revoked leaves, $V_{18}$ and $V_{19}$.

The main idea of the subset-difference method is to have a key for each of the outer subtrees that is known to everyone in the outer subtree but not known to anyone inside the inner (revoked) subtree. This key is designated as $L_{I,J}$. For example, for the outer subtree rooted at node $V_4$, this outer subtree including node $V_8$ and leaves $V_{16}$ and $V_{17}$, there is a key $L_{4,9}$ that is known only to leaves $V_{16}$, $V_{17}$ but not to leaves $V_{18}$, $V_{19}$. In this example, in order to revoke leaves $V_{18}$, $V_{19}$, $V_{21}$, $V_{24}$, $V_{25}$, $V_{26}$ and $V_{27}$, a new content key (CK) is sent out encrypted using the following difference keys: $L_{4,9}$, $L_{5,21}$ and $L_{3,6}$.

Keys $L_{I,J}$ are generated as follows. First, each inner node $V_I$ in the tree is assigned a unique and independent label $LABEL_I$. Then, a "difference label" for the left child of $V_I$ is derived using an one-way function $G_L$: $G_L$ ($LABEL_I$). Similarly, for the right child of $V_I$, a difference label $G_R(LABEL_I)$ is created. Next, in order to compute a difference label $LABEL_{I,J}$ for an outer subtree rooted at node $V_I$ and an inner subtree rooted at node $V_J$, one has to start with the original label $LABEL_I$ for node $V_I$ and then derive the difference label by applying functions $G_L$ and $G_R$ multiple times, depending on the path between $V_I$ and $V_J$. For example, label $LABEL_{3,28} = G_L(G_L(G_R(LABEL_3)))$. The key $L_{I,J}$ is then computed by simply applying another one-way function $G_M$ to the difference label $LABEL_{I,J}$, i.e., $LI,J=G_M(LABEL_{I,J})$.

When a particular leaf "u" is first initialized (i.e., when joining a multicast), this leaf "u" receives the following labels: for every $V_I$ ancestor of leaf "u", leaf "u" receives all difference labels that are "hanging off the path" from $V_I$ to leaf "u". From each of the labels, leaf "u" can derive the keys that it needs. For example, the path from root $V_1$ to leaf $V_{22}$ is as follows: $V_1$, $V_2$, $V_5$, $V_{11}$ and $V_{22}$. When leaf $V_{22}$ is initialized, it would receive the following difference labels:

$LABEL_{1,3}$, $LABEL_{1,4}$, $LABEL_{1,10}$, $LABEL_{1,23}$,
$LABEL_{2,4}$, $LABEL_{2,10}$, $LABEL_{2,23}$,
$LABEL_{5,10}$, $LABEL_{5,23}$,
$LABEL_{11,23}$

The foregoing is graphically illustrated in FIG. 2.

Referring back to FIG. 1, in order to revoke the indicated leaves ($V_{18}$, $V_{19}$, $V_{21}$, $V_{24}$, $V_{25}$, $V_{26}$ and $V_{27}$), as previously mentioned, the new content key is sent out encrypted using $L_{4,9}$, $L_{5,21}$ and $L_{3,6}$. In order for $V_{22}$ to obtain the new content key, $V_{22}$ derives $L_{5,21}$ from $LABEL_{5,10}$ (which it was given during initialization) as follows:

$$L_{5,21} = G_M(LABEL_{5,21}) = G_M(G_R(LABEL_{5,10}))$$

The number of keys received by a leaf "u" during initialization turns out to be:

$$Log(N)+(Log(N)-1)+(Log(N)-2)+\ldots+1 = Log(N)*(Log(N)+1)/2$$

The foregoing can be simplified to $O(\log(N)^2)$, where $O(N)$ is the number of messages required for one rekeying for N users participating in the multicast. For example, with N=8 million $\sim 2^{23}$, each user joining a multicast would get initialized with two hundred and seventy-six (276) keys. In the case that each key is one hundred and twenty-eight (128) bits (or sixteen (16) bytes) in length, this would require 276*16~4.5 Kbytes of key storage. Where a security chip is utilized, these keys would probably have to be stored encrypted outside of the chip. Details of the subset-difference method can be further found in the publication, "Revocation and Tracing Schemes for Stateless Receivers", by D. Naor et al., the disclosure of which is hereby incorporated by reference in its entirety for all purposes.

One main problem with the subset-difference method is that once some users in the group are revoked, none of the inner node labels and none of the difference keys are modified. As a result, in order to insure that the previously revoked users do not receive any more content keys, these users have to be counted as to-be-revoked users during each rekeying even though they have already been revoked previously. In other words, during each rekeying, previously revoked users have to be counted again for revocation purposes. Thus, the number of to-be-revoked leaves R grows each time and could eventually approach the total number of leaves N in the tree.

It would be impractical to modify the inner node labels during each rekeying because of the way the keys are derived from the labels. For example, if root label $LABEL_1$ is modified, it automatically affects the values of all of the difference labels $LABEL_{1,x}$ and most of the leaves in the tree will have to be updated with some new difference labels. Consequently, modifying the inner node labels during each rekeying presents a scalability problem.

In addition to this problem, since each user of the group has to be initialized with a considerable amount of keying material which in the worst case scenario could amount to several Kbytes, it would be impractical to initialize each user joining a multicast with all of the necessary labels at the time s/he joins the multicast.

Hence, it would be desirable to provide an improved subset-difference method that is able to improve multicast key management in a network to allow for more efficient revocation of users from a group and conversely rekeying of remaining users.

BRIEF SUMMARY OF THE INVENTION

An improved subset-difference method is provided. The improved method uses the value of a current content key to help generate the requisite difference keys. The requisite difference keys are then used to encrypt the next content key which will be delivered only to users who are supposed to remain in the group. Users who have the current content key are then able to generate the requisite difference keys which they can then use to decrypt the next content key. Using the decrypted next content key, the users are then able to continue to receive contents. Since previously revoked users do not have the current content key, they are unable to determine the next content key and thus are prevented from receiving future contents.

In an exemplary application, the present invention can be deployed in systems that rely on secure information delivery where the information is encrypted using a common group key. Such systems include, for example, multicast or broadcast content delivery systems.

The exemplary method of the present invention provides a number of advantages and/or benefits. For example, in order to rekey a group, only O(r) messages are needed, where r is the number of users to be revoked, as compared to the subset-difference method, where O(R) messages are needed to accomplish the same task, only that R is the number of users that have been revoked from the very beginning of a multicast.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
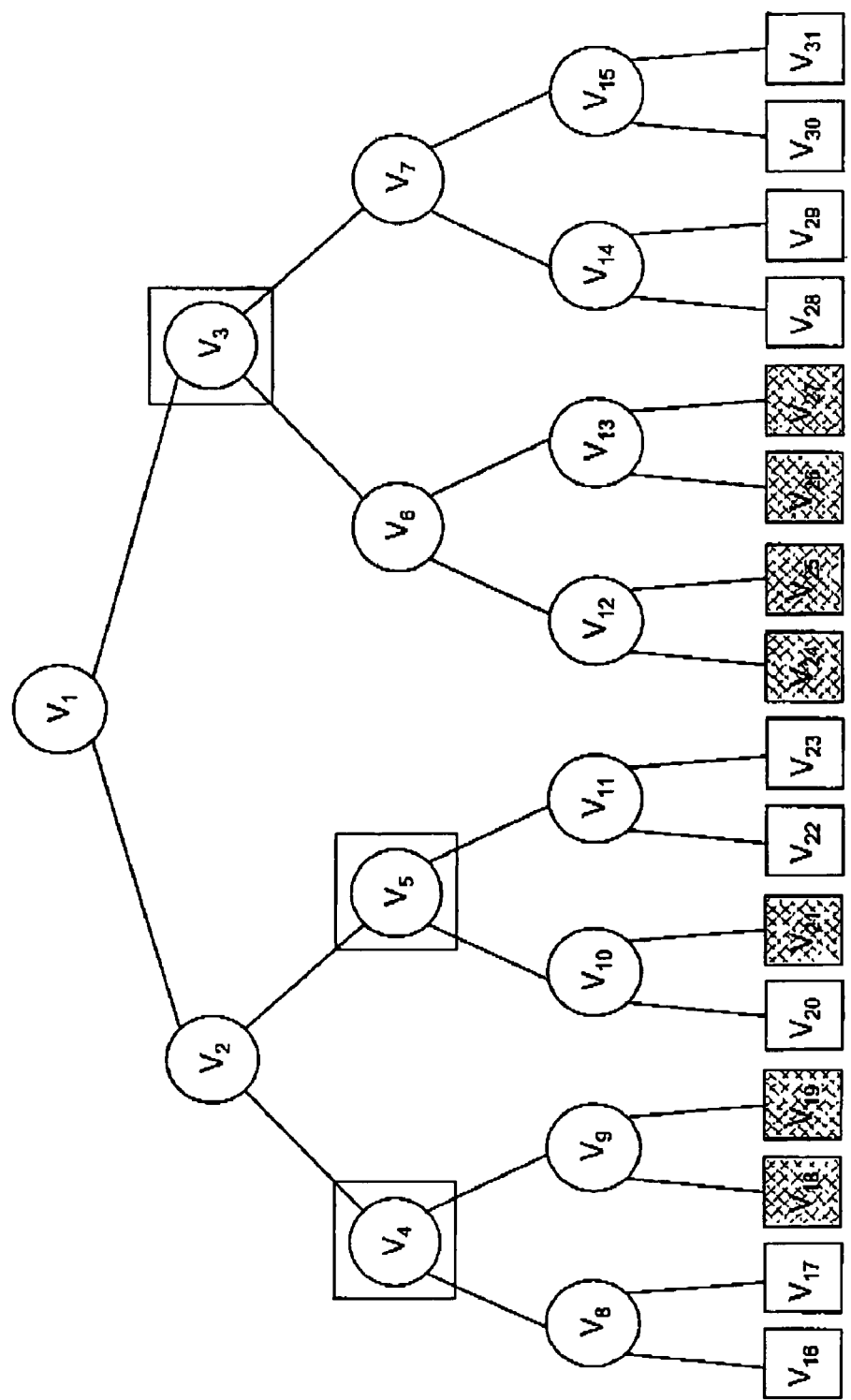
FIG. 1 is a simplified schematic diagram illustrating a set of users of a particular multicast that have been arranged into a binary tree according to the subset-difference method.
Figure 2:
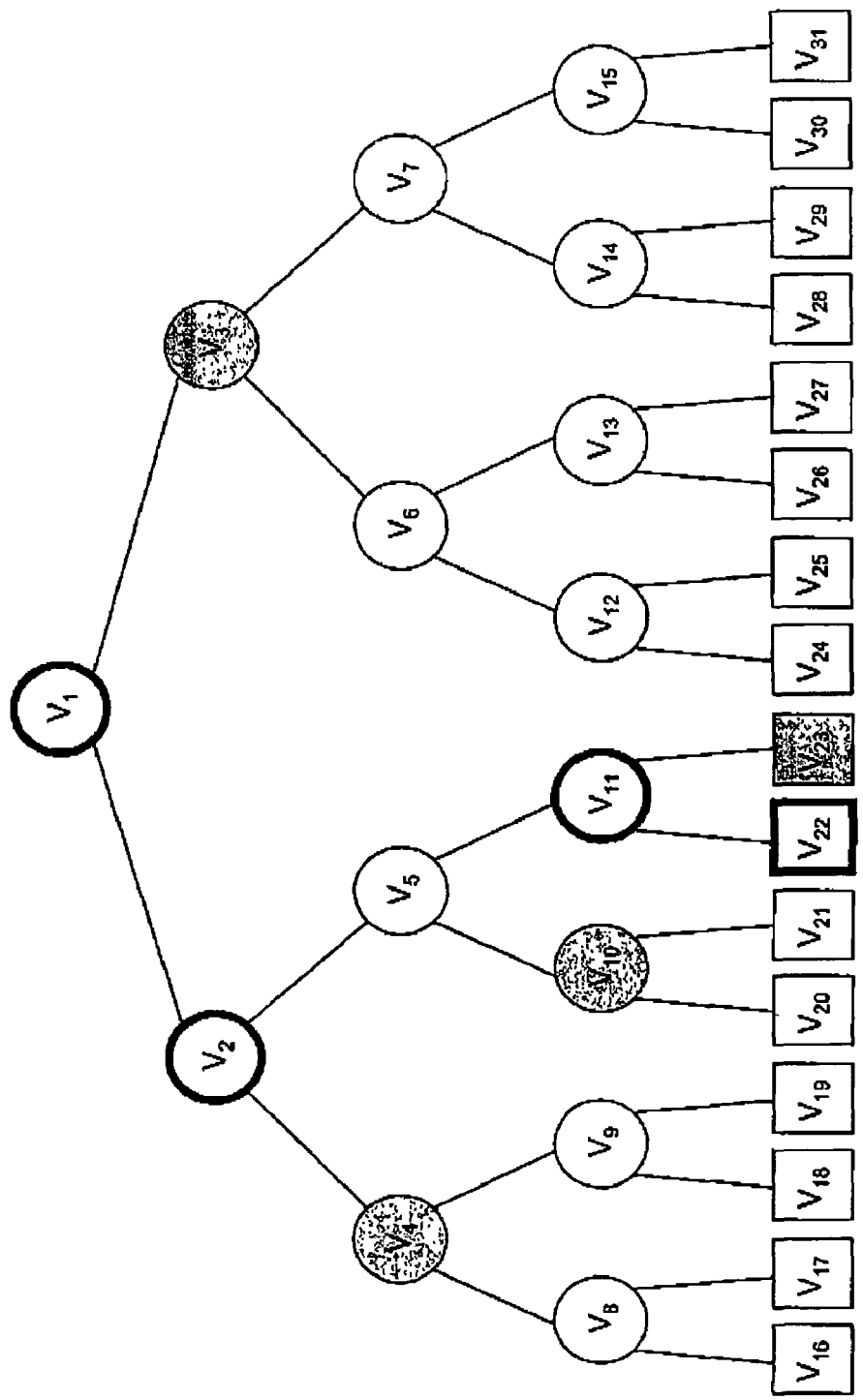
FIG. 2 is a simplified schematic diagram illustrating initialization of a leaf in a binary tree according to the subset-difference method.

The present invention in the form of one or more exemplary embodiments will now be described. According to one exemplary method of the present invention, the subset-difference method as described above is improved such that the overhead of removing members from a multicast group is proportional only to the size of the next set of members that want to leave the group.

The exemplary method modifies the subset-difference method to achieve the foregoing improvement as follows. Assume that the current content key is $CK_P$ and the next content key that is to be sent out during revocation of some leaves in the tree is $CK_{P+1}$. Then, the difference key $L_{I,J}$ is computed as follows:

$$L_{I,J}=G_M(LABEL_{I,J}, CK_P)$$

During the next rekeying, difference keys are changed to the following values:

$$L_{I,J}=G_M(LABEL_{I,J}, CK_{P+1})$$

Also, the content key will be changed to $CK_{P+2}$.

During the second rekeying, since previously revoked users in the group do not know the content key $CK_{P+1}$, they will not be able to generate the correct difference key $L_{I,J}$ and therefore they will also not be able to figure out the value of $CK_{p+2}$. As a result, any previously revoked user that does not possess a current content key is unable to get the next content key even if it had all the labels in the tree. Hence, during the second rekeying, it is not necessary to revoke the previously revoked leaves again. In other words, only the additional to-be-revoked leaves need to be revoked.

In some situations, a user that previously left the group may re-join subsequently and gets a different position in the tree. In this case, the user will have the difference keys for two different leaves and if that user leaves a second time, it may still be able to get content keys using its difference keys from the first period of membership in the group. In order to avoid this situation of users getting unauthorized content keys, the respective positions of revoked users in the tree are recorded and if a revoked user joins again, it is given the same position as last time when it was in the group.

With respect to the issue of amount of keying material needed to initialize a user joining a multicast group, the amount of such material can be reduced by not varying the labels for each multicast. The tree with all of its labels for inner nodes is kept relatively static, possibly only changing occasionally like the service keys. In one exemplary embodiment implemented using a Kerberos or ESBroker system, the values of the labels in the tree are globally made the same and are stored in a key distribution center (KDC) database. The KDC database is responsible for maintaining and handing out multicast group keys at a periodic interval. The KDC database would return a complete set of labels along with a ticket granting ticket (TGT) to each caching server and would also return an appropriate subset of the labels to each user along with the user's TGT. As a result, the user's position in he multicast key hierarchy would be determined during an initial exchange (AS Req/Rep) with the KDC database.

In one exemplary application where pay-by-time events are sold in units of program segments, the exemplary method for rekeying is applied to effect changing program segment keys. A difference key $L_{I,J}$ is computed as follows: $L_{I,J}=G_M(LABEL_{I,J}, PSK_P)$, where $PSK_P$ represents the program segment key. In this application, the very first $PSK_P$ delivered to a user that joins a group cannot be delivered using the exemplary method, since $PSK_{P-1}$ is not known at that time to this user. Preferably, the first $PSK_p$ would be delivered to a user using the same point-to-point protocol (e.g., Kerberos) that is used to verify the identity of this user and check if the user is authorized for the multicast.

Furthermore, in order to avoid cloning of the set of difference labels. The KDC database can change the set of difference labels on a periodic basis, such as once a month or once every several months, and the different sets of labels could be identified with a predetermined version number for synchronization.

In one exemplary embodiment, the present invention is implemented in the form of control logic using computer software. Based on the disclosure and teachings provided herein, it will be appreciated by a person of ordinary skill in the art that the present invention can be implemented in other ways and/or methods including, for example, hardware and/or a combination of hardware and software.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

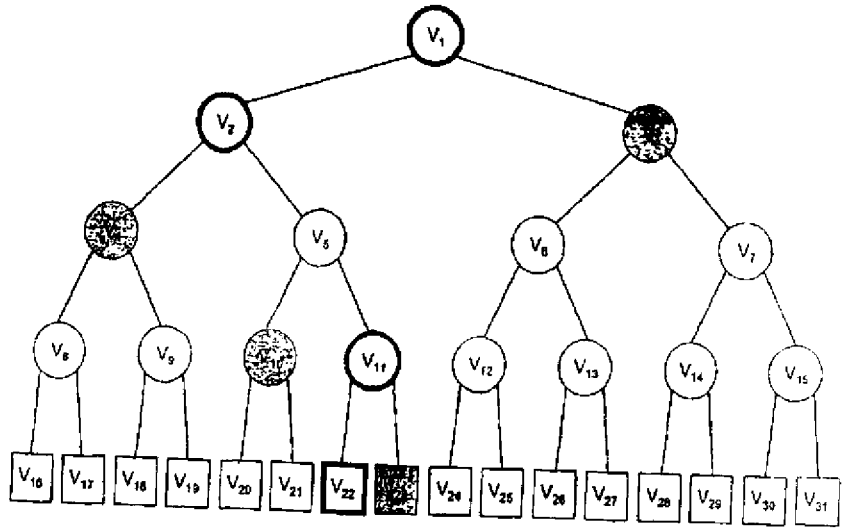

What is claimed is:

1. An improvement to a subset-difference method, the subset-difference method using a plurality of difference keys to encrypt a content key, each of the plurality of difference keys being generated by using a corresponding label, the improvement comprising:
   generating during a first rekeying each of the plurality of difference keys $L_{I,J}$ by applying a one-way function $G_M$ to the corresponding current label, $LABEL_{I,J}$ and a first current content key, $CK_P$;
   generating during a next rekeying each of the plurality of difference keys $L_{I,J}$ by applying a one-way function $G_M$ to the corresponding current label, $LABEL_{I,J}$ and the next current content key, $CK_{P+1}$; and
   wherein the next sequential content key, $CK_{P+2}$ generated by applying a one-way function $G_M$ to the corresponding current label, $LABEL_{I,J}$ and content key, $CK_{P+1}$, is used to ensure continued delivery of contents.

2. The improvement of claim 1 wherein the improvement and the subset-difference method are implemented in a content delivery system that is capable of providing multicasting.

3. The improvement of claim 2 wherein the content delivery system includes a plurality of clients under the control of corresponding users, a key distribution center and a caching server; and
   wherein the key distribution center delivers the corresponding labels that are used to respectively generate the plurality of difference keys to the plurality of clients and the caching server.

4. The improvement of claim 1 wherein the content key represents a program segment key;
   wherein the current content key represents a current program segment key;
   wherein the next content key represents a next program segment key; and
   wherein the next program segment key is used to ensure continued delivery of a next program segment.

5. The improvement of claim 1 wherein the improvement and the subset-difference method are implemented using computer software.

* * * * *

UNITED STATES PATENT AND TRADEMARK OFFICE
CERTIFICATE OF CORRECTION

PATENT NO. : 7,450,722 B2
APPLICATION NO. : 10/318486
DATED : November 11, 2008
INVENTOR(S) : Alexander Medvinsky It is certified that error appears in the above-identified patent and that said Letters Patent is hereby corrected as shown below:

On the title page please insert the illustrative figure with the attached title page.

COLUMN 2:
Line 63: Please delete "$L_{I,j}$," and replace with --$L_{I,J}$--.

Line 65: Please delete "$LI,J=G_M(LABEL_{I,J})$:" and replace with --$L_{I,J}=G_M(LABEL_{I,J})$.--.

Signed and Sealed this

Seventeenth Day of November, 2009

David J. Kappos
*Director of the United States Patent and Trademark Office*

United States Patent
Medvinsky

(10) Patent No.: US 7,450,722 B2
(45) Date of Patent: Nov. 11, 2008

(54) SUBSET DIFFERENCE METHOD FOR MULTI-CAST REKEYING

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 408 days.

(21) Appl. No.: 10/318,486

(22) Filed: Dec. 13, 2002

(65) Prior Publication Data

US 2004/0114762 A1    Jun. 17, 2004

(51) Int. Cl.
*H04L 9/16* (2006.01)
*H04L 9/08* (2006.01)
*H04K 1/00* (2006.01)

(52) U.S. Cl. .................... 380/277; 380/273; 713/163
(58) Field of Classification Search ............ 380/277, 380/273; 713/163
See application file for complete search history.

(56) References Cited

U.S. PATENT DOCUMENTS

| | | | |
|---|---|---|---|
| 7,065,643 B1* | 6/2006 | Cornils et al. | 713/163 |
| 2002/0002678 A1* | 1/2002 | Chow et al. | 713/169 |
| 2002/0094081 A1* | 7/2002 | Medvinsky | 380/44 |
| 2002/0104001 A1* | 8/2002 | Lotspiech et al. | 713/163 |
| 2002/0133701 A1* | 9/2002 | Lotspiech et al. | 713/163 |
| 2002/0138437 A1* | 9/2002 | Lewin et al. | 705/51 |
| 2002/0172366 A1* | 11/2002 | Peterka et al. | 380/277 |
| 2003/0044017 A1* | 3/2003 | Briscoe | 380/277 |
| 2003/0126464 A1* | 7/2003 | McDaniel et al. | 713/201 |
| 2003/0140235 A1* | 7/2003 | Immega et al. | 713/186 |
| 2003/0142826 A1* | 7/2003 | Asano | 380/277 |
| 2003/0198350 A1* | 10/2003 | Foster et al. | 380/281 |

OTHER PUBLICATIONS

Naor, Moni et al., "Efficient Trace and Revoke Schemes," Lecture Notes In Computer Science; vol. 1962, Proceedings of the 4th International Conference on Financial Cryptography, 2000, pp. 1-20.*
Halevy D.; Shamir A.: The LSD Broadcast Encryption Scheme; CRYPTO 2002 LNCS 2442, pp. 47-60, Springer-Verlag Berlin Germany XP002279256—Abstract; p. 47, Line 1; p. 56, last line.
Naor, Dalit, et al., "Revocation and Tracing Schemes for Stateless Receivers," IBM Almaden Research Center, Feb. 24, 2001, 33 pages.

* cited by examiner

*Primary Examiner*—Emmanuel L Moise
*Assistant Examiner*—Michael Pyzocha
(74) *Attorney, Agent, or Firm*—Stewart M. Wiener

(57) ABSTRACT

An improved subset-difference method is provided. The improved method uses the value of a current content key to help generate the requisite difference keys. The requisite difference keys are then used to encrypt the next content key which will be delivered only to users who are supposed to remain in the group. Users who have the current content key are then able to generate the requisite difference keys which they can then use to decrypt the next content key. Using the decrypted next content key, the users are then able to continue to receive contents. Since previously revoked users do not have the current content key, they are unable to determine the next content key and thus are prevented from receiving future contents.

5 Claims, 2 Drawing Sheets